United States Patent
Cayton et al.

(10) Patent No.: US 7,166,663 B2
(45) Date of Patent: Jan. 23, 2007

(54) NANOSTRUCTURED COMPOSITIONS

(75) Inventors: Roger H. Cayton, Naperville, IL (US); Richard W. Brotzman, Jr., Naperville, IL (US)

(73) Assignee: Nanophase Technologies Corporation, Romeoville, FL (US)

( * ) Notice: Subject to any disclaimer, the term of this patent is extended or adjusted under 35 U.S.C. 154(b) by 275 days.

(21) Appl. No.: 10/287,144

(22) Filed: Nov. 4, 2002

(65) Prior Publication Data

US 2003/0109634 A1    Jun. 12, 2003

Related U.S. Application Data

(60) Provisional application No. 60/338,887, filed on Nov. 3, 2001.

(51) Int. Cl.
*C08K 3/22* (2006.01)
*C08K 3/10* (2006.01)
*C08K 3/34* (2006.01)

(52) U.S. Cl. ............... 524/430; 524/404; 524/424; 524/429; 524/492; 524/493; 524/494; 977/DIG. 1

(58) Field of Classification Search ......... 524/492, 524/493, 494, 430
See application file for complete search history.

(56) References Cited

U.S. PATENT DOCUMENTS

| | | | |
|---|---|---|---|
| 5,069,945 A | 12/1991 | Wrasidlo | |
| 5,460,701 A | 10/1995 | Parker et al. | |
| 5,514,349 A | 5/1996 | Parker et al. | |
| 5,573,783 A | 11/1996 | Desieno et al. | |
| 5,874,684 A | 2/1999 | Parker et al. | |
| 6,228,904 B1 | 5/2001 | Yadav et al. | |
| 6,593,395 B2 * | 7/2003 | Angeletakis et al. | 523/115 |
| 6,667,360 B1 * | 12/2003 | Ng et al. | 524/492 |
| 6,939,908 B1 * | 9/2005 | Singhal et al. | 524/430 |

FOREIGN PATENT DOCUMENTS

| | | |
|---|---|---|
| EP | 0699964 A1 | 3/1996 |
| WO | WO 93/09169 A2 | 5/1993 |

* cited by examiner

*Primary Examiner*—Tae H Yoon
(74) *Attorney, Agent, or Firm*—Wildman, Harrold, Allen & Dixon LLP

(57) ABSTRACT

A material composition made of a matrix material, a nano-sized particulate fraction and a micron-sized particulate fraction. A process of making a nano-structured composition. A nano-structured material is provided to initiate a mixture. A micron-sized particulate material is added to the mixture. A matrix material is added to the mixture. Finally, the mixture is utilized to fabricate a nano-structured structure.

31 Claims, 8 Drawing Sheets

NANOSTRUCTURED COMPOSITIONS

CROSS REFERENCE TO RELATED APPLICATION

This application claims the priority of U.S. Provisional patent application Ser. No. 60/338,887 filed Nov. 3, 2001.

BACKGROUND OF THE INVENTION

Compounding polymeric compositions (e.g., polymeric films) with various particulate additives can improve their mechanical properties, such as hardness, scratch resistance, wear resistance, and abrasion resistance. The mechanical properties of the composition typically improve in proportion to the amount of particulate added. At a certain point, however, as the amount of the particulate increase, the optical properties of the composition, such as transparency, begin to degrade.

For example, three properties that determine the transparency of a particulate loaded polymeric composition are the particulate particle size, the difference between the refractive indexes of the composition and of the particulate, and the degree of dispersion of particulates throughout a polymeric composition. If a particulate additive has a size greater than the wavelength of visible light, the increasing addition of the particulate additive causes haze and eventually opacity. Likewise, inefficient particulate dispersion results in the clustering of added particulates in the polymeric composition thus leading to higher haze and lower transparency. Therefore, in transparent material systems the achievable mechanical property enhancements of particulate loaded polymeric compositions are limited. Either transparent films with limited, improved mechanical properties, or hazy-opaque films with improved mechanical properties are obtained.

Consequently, there is a need for particulate-filled compositions, such as polymeric films and coatings that exhibit improved combinations of physical and other properties.

SUMMARY OF THE INVENTION

Pursuant to the present invention, shortcomings of the existing art are overcome and additional advantages are provided through the provision of nanostructured compositions.

The invention in one example encompasses a material composition. The composition includes a matrix material, a nano-sized particulate fraction, and a micron-sized particulate fraction.

The invention in another example comprises a process of making a nano-structured composition. A nano-sized particulate material is provided to initiate a mixture. A micron-sized particulate material is added to the mixture. A matrix material is added to the mixture. Finally, a nano-structured material is fabricated with the mixture.

In a third example embodiment there is provided a nano-structured first material composition comprising: a polymeric matrix material; a substantially spherical nanocrystalline metal oxide a nano-sized particulate fraction; and a micron-sized metal oxide fraction.

In a fourth example there is provided a composition comprising a nano-sized particulate fraction wherein a substantially spherical nanocrystalline metal oxide fraction has of an average particle dimension in the range of from about 10 to about 100 nanometers.

In a fifth example there is provided a composition wherein comprising a nano-sized particulate fraction substantially spherical nanocrystalline metal oxide fraction has having an average particle dimension in the range of from about 10 to about 50 nanometers.

In a sixth example there is provided a composition wherein comprising a nano-sized particulate fraction the substantially spherical nanocrystalline metal oxide fraction having an average particle dimension in the range of 25 to about 40 nanometers.

In a seventh example there is provided a composition wherein the micron-sized metal oxide particulate fraction has an average particle dimension of from about 0.100 microns to 50 microns.

In an eighth example there is provided a composition wherein comprising a micron-sized metal oxide particulate fraction having an average particle dimension of from about 0.25 to 5 microns.

In a ninth example there is provided a composition comprising a micron-sized metal oxide particulate fraction having an average particle dimension of from about 0.3 microns to 1 micron.

In a tenth example there is provided a composition wherein the percentage of a nano-sized particulate fraction to a total added particulate fraction is in the range of 0.001:99.999 to 99.999:0.001.

In an eleventh example there is provided a composition wherein the percentage of a nano-sized particulate fraction is up to about 80 weight percent of the total of an added particulate fraction.

In a twelfth example there is provided a composition wherein the percentage of the nano-sized particulate fraction is about 35 to about 65 weight percent of a total added particulate fraction.

In a thirteenth example there is provided a composition wherein the total amount of added particulate fraction is up to 50 wt % of the total composition.

In an fourteenth example there is provided a composition wherein the total amount of added inorganic oxide material is up to 25 wt % of the total composition.

In a fifteenth example there is provided a composition wherein the total amount of added particulate fraction is up to 15 wt % of the total composition.

In an sixteenth example there is provided a composition wherein the total amount of added particulate fraction is up to 5 wt % of the total composition.

In an seventeenth example there is provided a composition wherein the particulate fraction is composed of alumina. In an additional embodiment there is provided a particulate-filled composition having a pencil hardness scratch resistance value is up to five times greater than that of a corresponding unfilled polymeric matrix material up to 20 wt % total alumina.

In an eighteenth example there is provided a composition wherein the light transmission is reduced less than 15 percent for a corresponding addition of up to 20 wt % total inorganic particulate additive when the additive is alumina.

In a nineteenth example there is provided a composition wherein the light transmission is reduced less than between 0.001 and 5 percent for an addition of up to 20 wt % alumina wherein the percentage of substantially spherically nanocrystalline alumina ranges from about 0.001 to 100 percent.

DETAILED DESCRIPTION

Figure 1:
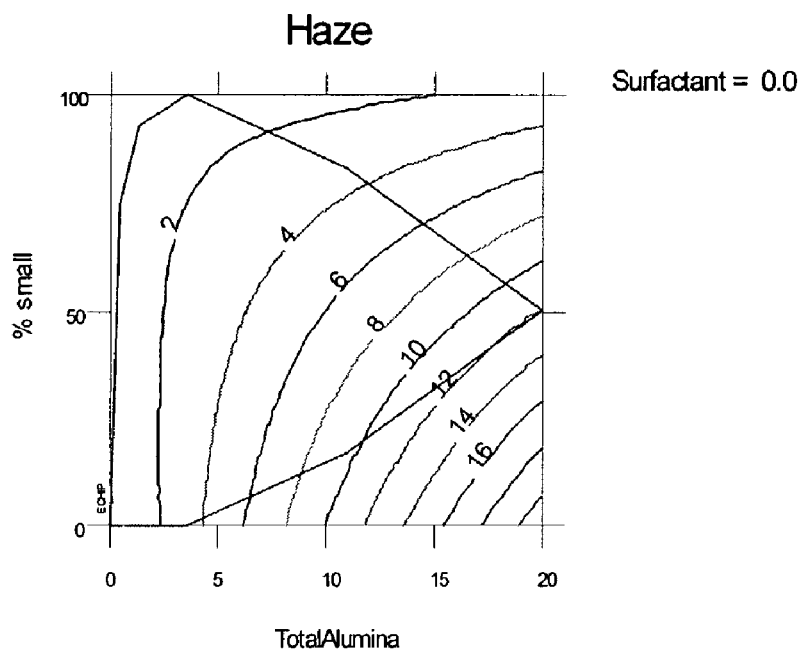
FIG. 1 is a 2D plot of haze, at 0.0 wt % surfactant, as a function of total alumina wt % and percent nano-alumina (indicated as % small in the graph) for an exemplary melamine-formaldehyde ("MF") composition.

The present invention relates to material compositions (also referred to as "nanostructured compositions") of matter and the preparation and use material compositions of matter.

In one example, the material compositions comprise a matrix material, a nano-sized particulate fraction, and a micron-sized particulate fraction.

The matrix material in one example is either a polymeric or oligomeric matrix material, either inorganic or organic in nature, or mixtures thereof. The matrix material can be a cross-linked material composition of the above-disclosed matrix materials, a thermoplastic material or combinations thereof. Examples of the matrix material are polyesters, polyurethane, silicones, silanes, melamine-formaldehyde-urea, phenol-formaldehyde resole and novolac, celluloics, melamine-polyol, acrylate, inorganic-based materials, emulsion-modified materials, cured and uncured compositions and the like.

The nano-sized particulate fraction in one example is a crystalline metal, metal oxide, or mixture thereof. In another example the nano-sized particulate fraction is a nanocrystalline metal, metal oxide, or mixture thereof. In a further example, the nano-sized particulate is selected from the group of single metal oxides, (e.g., alumina, ceria, iron oxide,, titania, chrome oxide, zinc oxide, zirconia, silica, etc.), mixed metal oxides (e.g., ATO, ITO, etc.), co-synthesized metal oxides (e.g., copper-iron oxide, etc.) and mixtures of metal oxides (e.g., alumina and titania, etc.), metals (e.g., silver, iron, etc.), coated metal oxides or metals (e.g., alumina lake, etc.), and other carbide, nitride, and boride particulate materials. In yet another example, the nano-sized particulate fraction is a substantially spherical nanocrystalline metal, metal oxide or mixtures thereof.

The nano-sized particulate fraction comprises nano-sized particles (also known as nano-structured particles or nano-particles) of the above referenced compositions. Nano-sized particles in one example refer to particles having a material structure and organization that is controlled at the 1 to 100-nanometer size range. Such particles can be prepared using the teachings of U.S. Pat. No. 5,460,701 to Parker, et al., U.S. Pat. No. 5,514,349 to Parker, et al., and U.S. Pat. No. 5,874,684 to Parker, et al., which are hereby incorporated by reference in the present application.

The micron-sized particulate fraction in one example is a crystalline metal, metal oxide, or mixtures thereof. In another example, the micron-sized particulate is a nanocrystalline metal, metal oxide, or mixture thereof. In a further example the micron-sized particulate is selected from the group of single metal oxides, (e.g., alumina, ceria, iron oxide, titania, chrome oxide, zinc oxide, zirconia, silica, etc.), mixed metal oxides (e.g., ATO, ITO, etc.), co-synthesized metal oxides (e.g., copper-iron oxide, etc.) and mixtures of metal oxides (e.g., alumina and titania, etc.), metals (e.g., silver, iron, etc.), coated metal oxides or metals (e.g., alumina lake, etc.), and other carbide, nitride, boride particulate materials.

The micron-sized particulate fraction comprises micron-sized particles (i.e., particles having a size of from about 0.100 to about 50 microns. Such particles can be prepared by comminution, precipitation, or other process known to those, skilled in the art. Often micron-sized particulates require calcination (thermal treatment) and size separation by sieving, air classification, etc.

Nano-sized particles incorporated into material compositions according to the present disclosure are useful in preparing transparent, low haze, abrasion resistant nano-structured polymeric compositions, including films and coatings, fibers and the like. In particular, films made according to the present disclosure, incorporating various certain combinations of nanocrystalline sized materials with micron-sized materials display unexpected, significant enhancements in physical properties compared with compositions compounded with a single size range of particulates. In particular, films incorporating various combinations of nano-sized particulates with micron-sized particulates exhibit unexpected enhancements in combinations of physical properties at specific ratios of nano-sized to micron-sized particulates that are not observed in compositions using either particulate by itself.

The application environment of films and coating are complex and often these compositions will be subjected to several types of abrasion stresses in application. As such the mechanical properties of the material composition depend not only on specific particulate properties, but also on properties of the polymer matrix such as glass transition, cross-link density, flexibility, and toughness. The polymer matrix must first be selected for a specific application environment and then significant abrasion resistance can be imparted to this composition by uniformly dispersing the proper selection of particulate additives throughout the composition. Uniform dispersion can be achieved through treatment of the particle surface to provide compatibility between the particles particulates and the polymer in which they are dispersed using a variety of organic and inorganic additives such as polymers, surfactants and inorganic solution deposited coatings other surface modification technology known to those of skill in the art.

Evaluating the abrasion resistance of nano-structured compositions is also complex. Some tests, such as steel wool scratch resistance, will determine the scratch resistance of only the exterior surface of the nano-structured composition. Yet other abrasion modes subject the surface and bulk of the nano-structured composition to stresses. The abrasion resistance of only the exterior surface of a nano-structured composition is governed be the number of surface particulates and the distance between particulates. Thus nano-sized particulates enable greater coverage of the exterior surface at a given weight loading, compared with micron-sized particulates, and abrasion resistance and transparency are linearly related to the particulate level.

However, incorporating nano-sized alumina particulate and micron-sized alumina particulate combinations into polymer film-forming coatings at approximately 40 to 60 wt % nano-sized alumina displays a maximum in certain surface and bulk mechanical properties. This becomes even more important in transparent, low haze, scratch resistant composite materials because these physical properties may be maximized without degrading film optical properties. In general, it has been discovered that nano-sized particulates, that is, particulates having an average particle size of from about 1 to 100 nanometers in one example, from about 10 to 50 nanometers in another example, and from about 25 to 40 nanometers in yet another example, can be added to conventional micron-sized particulates. The conventional micron-sized particulates in one example have an average particle size of from about 0.100 to about 50 microns in one example, from about 0.25 to about 5 microns in a further example, and from 0.35 microns to 5 microns in yet another example.

Figure 3:
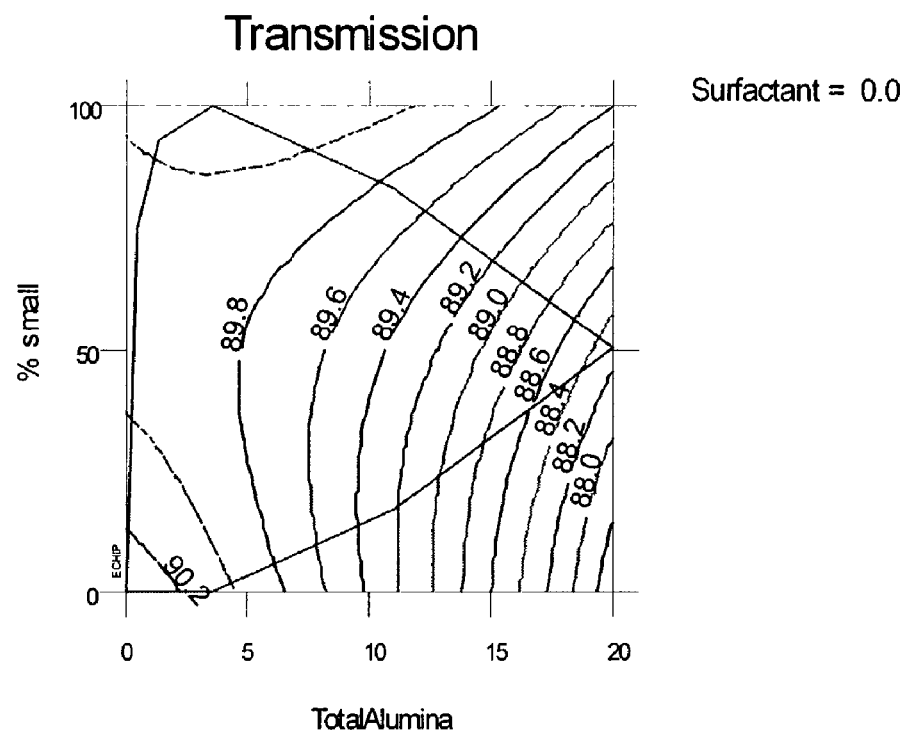
FIG. 3 is a 2D plot of transmission, at 0.0 wt % surfactant, as a function of total alumina wt % and percent nano-alumina (indicated as % small in the graph) for the MF composition.
Figure 4:
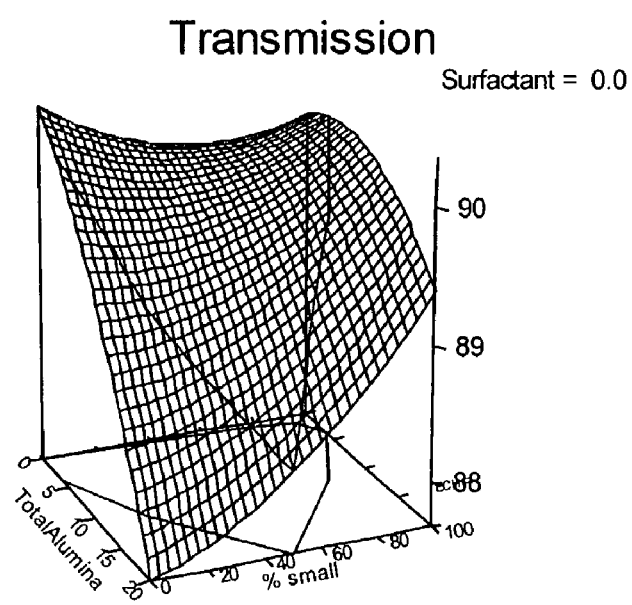
FIG. 4 is a 3D plot of transmission, at 0.0 wt % surfactant, as a function of total alumina wt % and percent, nano-alumina (indicated as % small in the graph) for the MF composition.
Figure 5:
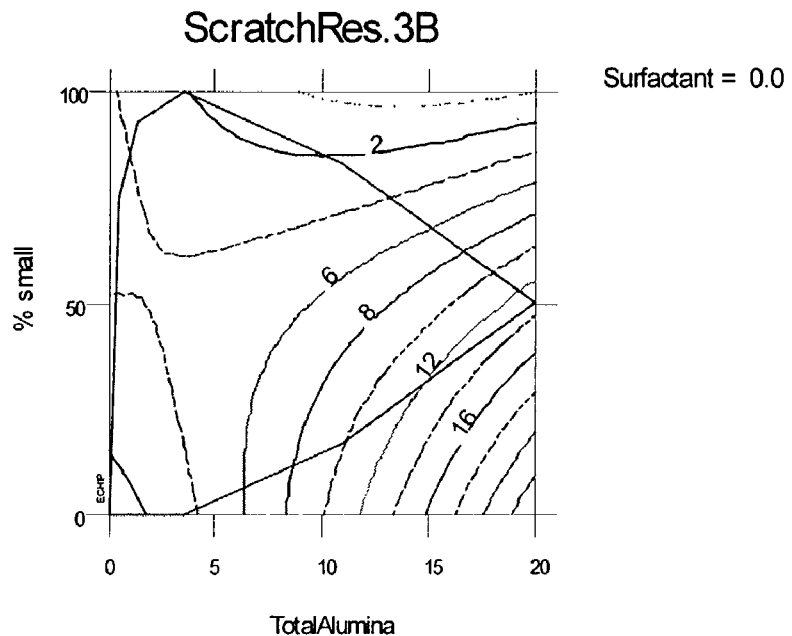
FIG. 5 is a 2D plot of film (and/or coating) hardness is presented as a function of total alumina wt % and percent nano-sized alumina (indicated as % small in the graphs) for 3B pencil hardness levels for the MF composition.
Figure 6:
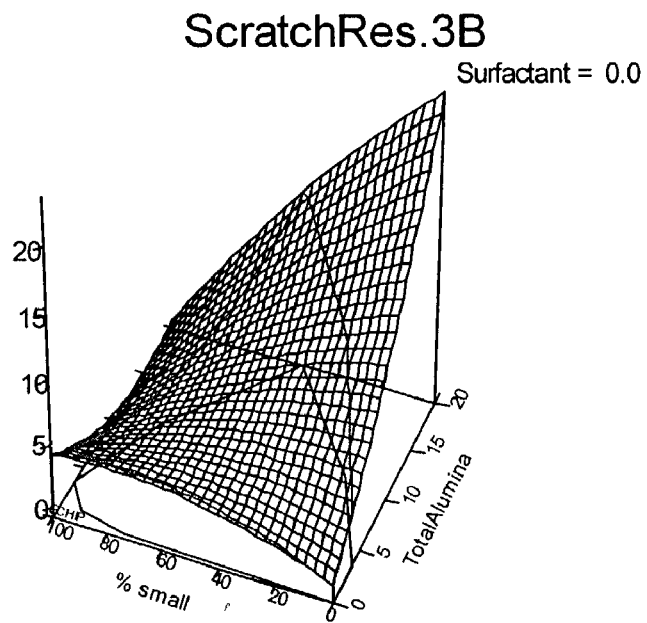
FIG. 6 is a 3D plot of film (and/or coating) hardness is presented as a function of total alumina wt % and percent nano-sized alumina (indicated as % small in the graphs) for 3B pencil hardness levels for the MF composition.
Figure 7:
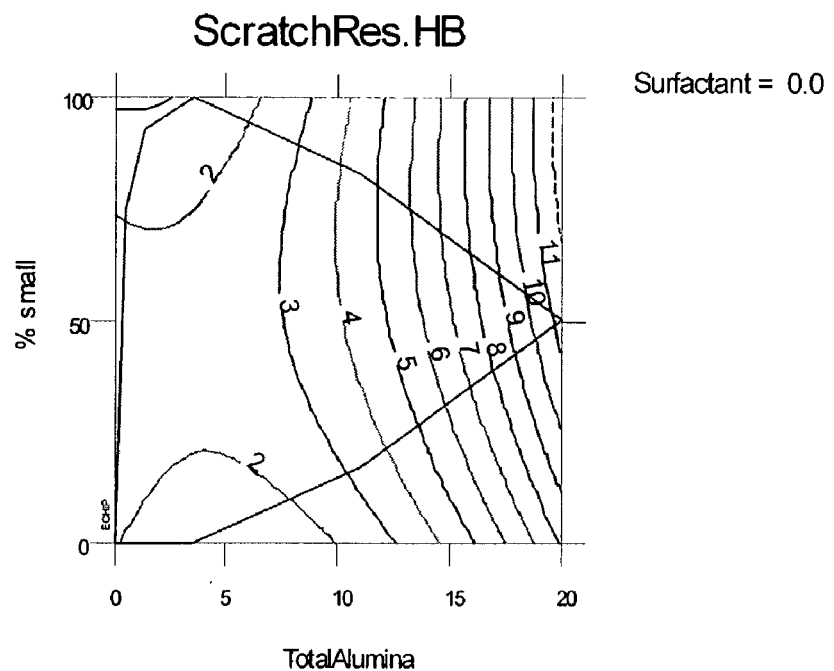
FIG. 7 is a 2D plot of film (and/or coating) hardness is presented as a function of total alumina wt % and percent nano-sized alumina (indicated as % small in the graphs) for HB pencil hardness levels for the MF composition.
Figure 8:
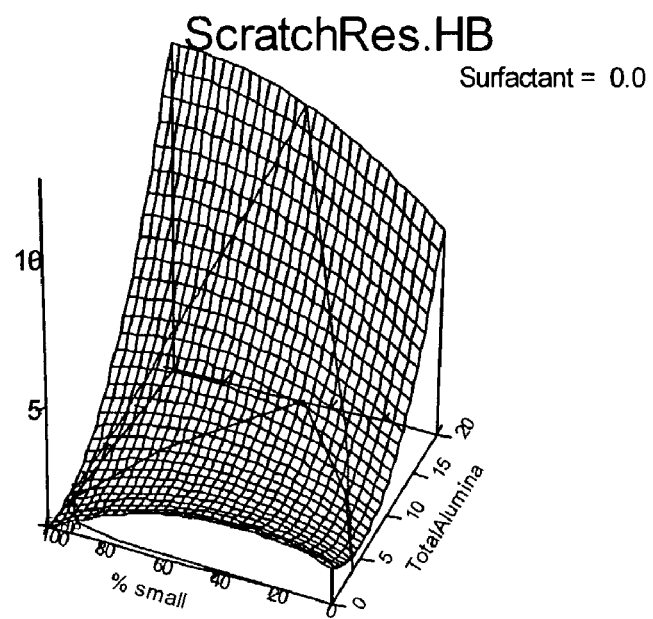
FIG. 8 is a 3D plot of film (and/or coating) hardness is presented as a function of total alumina wt % and percent nano-sized alumina (indicated as % small in the graphs) for HB pencil hardness levels for the MF composition.
Figure 9:
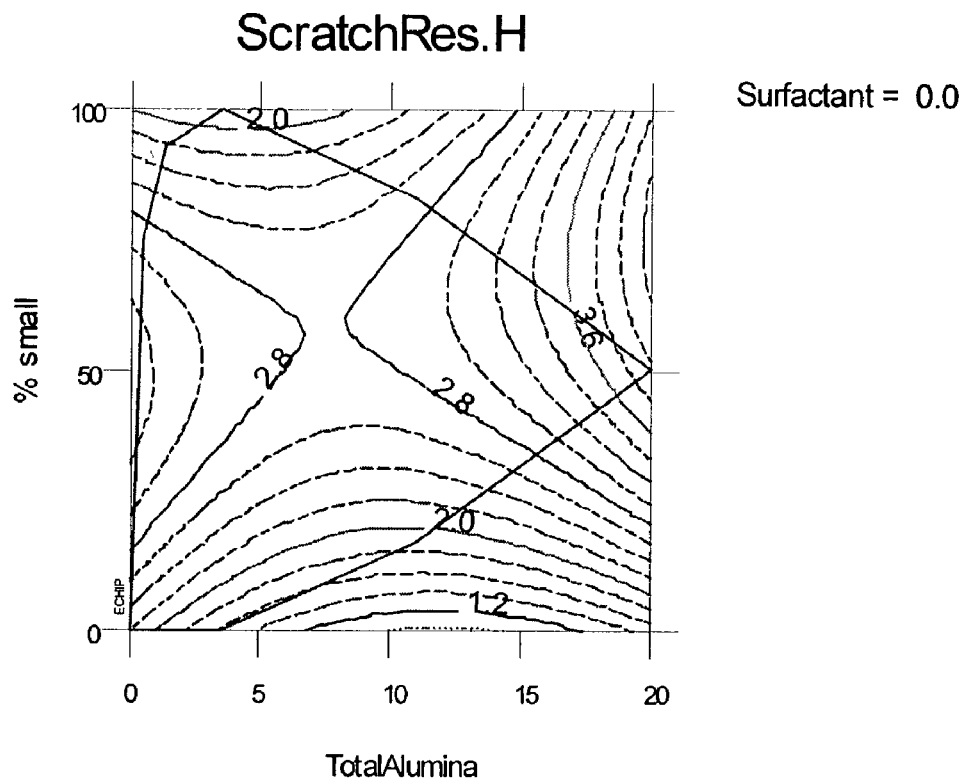
FIG. 9 is a 2D plot of film (and/or coating) hardness is presented as a function of total alumina wt % and percent nano-sized alumina (indicated as % small in the graphs) for H pencil hardness levels for the MF composition.
Figure 10:
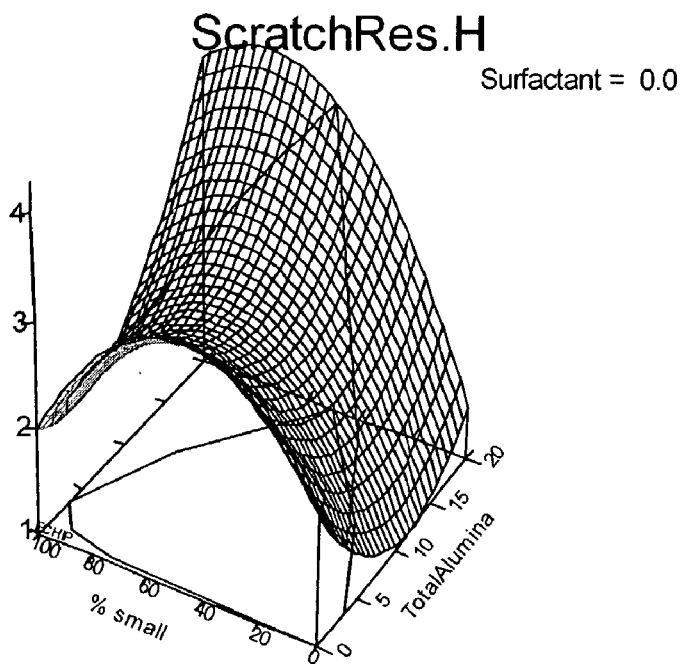
FIG. 10 is a 3D plot of film (and/or coating) hardness is presented as a function of total alumina wt % and percent nano-sized alumina (indicated as % small in the graphs) for H pencil hardness levels for the MF composition.

Film and coatings display mechanical property increases to levels not achievable with either nano-sized or micron-sized particulates alone. Further, film optical properties may be optimized for high transparency (see FIGS. 3 and 4 for a melamine-formaldehyde ("MF") system) and very low haze (see FIGS. 1 and 2 for the MF system and FIGS. 11 and 12 for a polyurethane ("PU") system) when prepared with certain fractions of nano-sized and micron-sized particulates. The nano-structured composition displays a maximum in pencil hardness (a measure of surface and bulk resistance to mechanical abrasion) with respect to the percent nano-sized particulate filler (see FIGS. 5 to 10 for the MF system and FIGS. 13 to 15 for the PU system). The maximum occurs at approximately 40 to 60 wt % nano-particulate particles with respect to total particulates. Hardness values in the range of 2-times to 3-times the hardness over a corresponding unfilled material are imparted to a film (and/or coating), at the maximum, in the range of five weight percent total alumina content independent of the polymer resin system used to form a film.

The maximum in pencil hardness occurs for both the MF (a water based) and the PU (an organic based) systems. This observation is independent of the polymer system and the solvent system and demonstrates that the combination of particulates provides for improvements in physical properties not predictable by linear combinations of physical properties based solely on the percentage of each individual additive particulate. Further, compatibilizing amounts of additives, such as surfactants that may be added to a nano-structured composition do not negatively affect the physical property enhancements. The MF system contains no surfactant while the PU system contains 7% surfactant, with respect to the particulate. Thus, multiple combinations of additives may be provided into polymeric formulations to provide improvements in properties as desired. This provides significant economic advantages because less expensive micron-sized particulates may be combined with nano-sized particulates, for example, substantially spherical nanocrystalline particulates, to achieve a superior combination of mechanical and optical properties in polymer films and coatings.

From FIGS. 5 to 10 and 13 to 15, the pencil hardness of nano-structured compositions displays a maximum, with respect to the percent nano-sized alumina, in the range up to 20 wt % alumina. The magnitude of this maximum is approximately in the range of 2-times to 3-times the hardness of an unfilled polymer film when the total particulate additives of the present invention are at 5-wt %. Data are presented for systems that contain surfactant levels from 0 to 7 wt % with respect to the particulate fraction; the non-linear behavior is observed irrespective of any surface compatibilization agent. This clearly demonstrates that the non-linear behavior requires only the presence of a nano-sized particulate fraction and a micron-sized particulate fraction in a polymeric matrix as described in the appended Examples, below.

Figure 2:
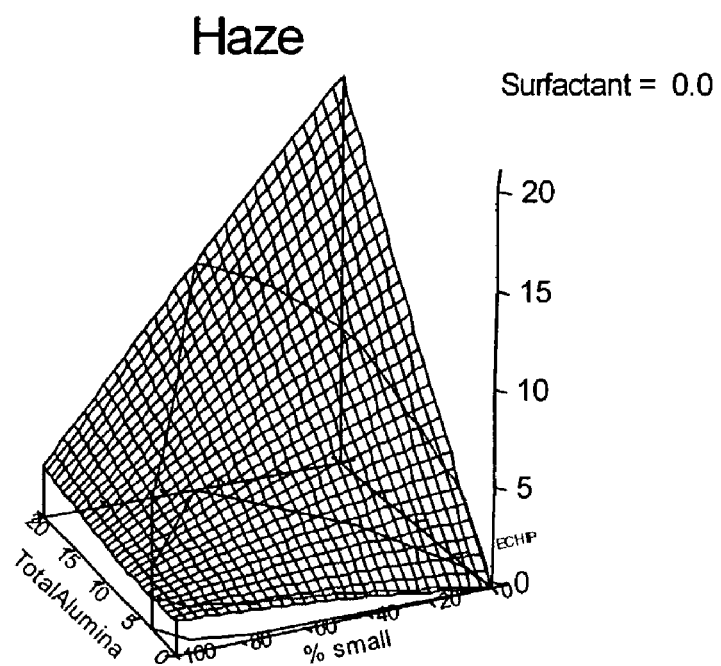
FIG. 2 is a 3D plot of haze, at 0.0 wt % surfactant, as a function of total alumina wt % and percent nano-alumina (indicated as % small in the graph) for the MF composition.

Certain melamine-formaldehyde ("MF") films with alumina were evaluated for performance of with alumina of different particle sizes. Experimentation with water-soluble MF polymer resin showed the incorporation of alumina with an average particle size of 30–40 nm improves the scratch resistance of thin films (FIGS. 5 to 10), while only slightly increasing the haze of such films (FIGS. 1 and 2). For example, inclusion of 20 weight percent NTC alumina in an MF film yielded up to 3.5-times the scratch resistance of neat unfilled MF resin, while the haze increased from about 0.23% to 0.77%. In comparison, a larger commercially available alumina (A-16, Alcoa, average particle size of 500 nm) provided greater scratch resistance (up to 8 times that of a neat MF resin at a loading of 20 wt % alumina), with a signfincant increase in haze (18.9%).

In contrast, in one embodiment of the present invention, combinations of nano-sized alumina and Alcoa A-16 micron-sized alumina in MF resin displayed haze values having linear additive behavior (see FIGS. 1 and 2), indicating that each alumina component acts independently with respect to its haze contribution. However, there is a non-linear effect with respect to the hardness of MF films containing blends of NTC nano-sized alumina and Alcoa A-16 micron-sized alumina. In another embodiment, at 20 wt. % total alumina in MF film, the scratch resistance of a 25/75:NTC/A-16 blend was increased up to 2.5× that of 100% A-16, and up to 3.5×that of a 50/50 NTC/A-16 blend.

The following non-limiting examples are provided for illustrative purposes:

EXAMPLES

To evaluate the effect of alumina particle size on transparency and film (and/or coating) hardness, designed experiments were conducted to further illustrate certain nonlimiting novel combinations of the invention. Statistically designed experiments, were used to prepare embodiments of the present invention. The resulting data, Table I, below, shows a first experimental design:

TABLE I

Experimental Design - Outline

| Variables | Variable Range |
|---|---|
| Total Alumina, wt % | 0   20 |
| Wt % NTC (nanosized)Alumina | 0   100 (with respect to total alumina) |
| Surfactant (K-15), wt %/alumina | 0   10 (with respect to total alumina) |

Example 1

The Alumina Dispersion Preparation

A dispersion was prepared by mechanical mixing NTC nano-sized alumina and Alcoa micron-sized A-16 alumina in water in vials. The required level of commercially available K-15 surfactant, in the solid form, was added and the mixture sonicated for 30 minutes to dissolve K-15 (PVP K-15, 1-ethenyl-1-pyrrolidinone homopolymer, CAS: 9003-39-8, ISP Technologies, Inc.) to yield a homogeneous dispersion.

Example 2

Particulate and Polymer Mixtures

Mixtures were prepared in the following manner:
1. For each trial, 5.00 g of MF (BTL Melamine Resin, BTLM 817) resin/water solution, 50.82 wt % solids, were weighed out into a vial.
2. From the specified alumina dispersion the required amount of dispersion for each was added to the resin.
3. Water was added as required and the vials sonicated for about 10 minutes until thoroughly mixed.

Example 3

Films Preparation

Films were prepared in the following manner:
1. Clean glass slides were prepared.
2. Using a 1.0 mil Bird film draw-down bar, drawn films of the particulate/polymer blends on glass slides were prepared. Blends were thoroughly mixed before withdrawing samples, and draw-downs were performed quickly after the blend was placed on the glass slide to enable uniform film preparation.
3. The polymer films formed were cured by drying for 15 min at 150° C. horizontally in an oven.

Example 4

Measurement of Film Properties
1. Films were measure for haze and transmittance on glass by averaging the readings over 5 positions on the film using ASTM-1003 and ASTM-1044 protocols with a BYK Gardner Haze-Gard Plus™ device.
2. Film hardness measured on glass was determined by the least weight necessary to cause a scratch for specified pencil leads of differing hardness using ASTM standard D-3353. Hardness is reported below as a ratio of a film's hardness value with respect to an unfilled film at equal pencil hardness. The following Table II shows a tabular result of the Haze, Percent Transmission, and Hardness values of each Trial. Haze data are plotted in FIGS. 1 and 2. Transparency data are plotted in FIGS. 3 and 4. Pencil hardness data are plotted in FIGS. 5–10 for pencil hardness values of 3B, HB, and H.

| Trial | Haze | % T | SR.3B | SR.HB | SR.H |
|---|---|---|---|---|---|
| 1 | 1.17 | 90 | 7.5 | 4 | 2 |
| 2 | 20.1 | 87.6 | 25 | 6 | 2 |
| 3 | 0.61 | 90.1 | 2.5 | 3 | 2 |
| 4 | 2.95 | 89.3 | 7.5 | 9 | 4 |
| 5 | 1.04 | 89.6 | 2 | 4 | 4 |
| 6 | 13.4 | 88.1 | 10 | 12 | 4 |
| 7 | 0.78 | 89.6 | 20 | 8 | 3 |
| 8 | 13 | 88.1 | 15 | 12 | 2 |
| 9 | 5.13 | 89.8 | 10 | 4 | 2 |
| 10 | 4.19 | 89.7 | 4.7 | 4.7 | 3.3 |
| 11 | 11.7 | 88.7 | 7.5 | 5 | 1 |
| 12 | 2.07 | 89.4 | 20 | 7 | 4 |
| 13 | 6.97 | 89 | 7.5 | 5 | 4 |
| 13 | 3.08 | 90 | 1.8 | 1 | 1 |
| 14 | 6.44 | 89.5 | 7.5 | 4 | 2 |
| 14 | 7.11 | 89.5 | 25 | 4 | 3 |
| 14 | 7.62 | 89 | 7.5 | 5 | 2 |
| 15 | 0.52 | 90.1 | 1 | 0.7 | 2 |
| 16 | 2.66 | 90.2 | 1.4 | 1 | 1 |
| 17 | 2.91 | 89.8 | 1 | 1 | 2 |
| 18 | 0.97 | 90.4 | 1 | 1.3 | 1 |
| 18 | 0 98 | 89.8 | 1.8 | 1.3 | 4 |
| 19 | 2.78 | 90 | 2 | 3.3 | 2 |
| 20 | 0.92 | 90.1 | 4.8 | 1.3 | 2 |
| 21 | 4.05 | 89.8 | 1.4 | 1 | 1 |
| 22 | 0.97 | 90.4 | 1.8 | 1 | 3 |
| 23 | 2.08 | 90 | 10 | 1 | 3 |
| 23 | 2.34 | 89.5 | 10 | 4 | 4 |
| 23 | 1.93 | 89.9 | 1.4 | 1.3 | 1 |
| 24 | 0.64 | 90.1 | 3.4 | 4 | 5 |
| 25 | 5.76 | 89.6 | 2 | 0.7 | 1 |
| 26 | 3.21 | 89.9 | 7 | 3.3 | 1 |
| 27 | 2.87 | 89.9 | 10 | 5 | 6 |
| 28 | 3.51 | 89.4 | 8 | 42 | 2 |
| 29 | 0.94 | 89.7 | 10 | 2 | 3 |
| 30 | 6.66 | 89.9 | 3 | 1.3 | 2 |
| 31 | 1.28 | 90.1 | 1 | 1.3 | 2 |
| 32 | 2.98 | 89.9 | 3.4 | 1.7 | 3 |
| 32 | 3.25 | 89.8 | 1.4 | 1.7 | 2 |
| 32 | 3.23 | 90 2 | 2 | 1.3 | 3 |
| 32 | 3.41 | 89.9 | 3 4 | 1.7 | 4 |
| 33 | 0.31 | 90.4 | 1 | 1 | 1 |

Haze results, for the 0.0 wt % surfactant level, as a function of total alumina wt % and percent nano-sized alumina (indicated as % small in the graphs), are presented in the 2D and 3D FIGS., 1 and 2, below. Haze displays linear additive behavior.

Film hardness values display a maximum with respect to the percent nano-sized alumina, from 0 wt % to 5 wt % total alumina. This non-linear behavior was observed for water-based resin system. This is a surprising and unexpected result. The magnitude of the maximum is approximately 2–3, or 2-times to 3-times the hardness is imparted to the film (and/or coating) with respect to the unfilled polymer. The location of the maximum in hardness with respect to wt % nano-sized alumina is approximately 50 wt %, with respect to total alumina.

At higher amounts of total alumina the physical properties of this composition are equally impressive. At 15 wt % total alumina and 50% nano-sized alumina the composition has 9% haze (FIGS. 1 and 2), a reduction in light transmission with respect to the polymer containing no particulates of 2% (FIGS. 3 and 4—the unfilled polymer had a transmission of 90.4%), pencil hardness 10, 7, and 3.2 times the polymer containing no particulates for pencil hardness values of 3B, HB, and B, respectively (FIGS. 5 through 10). At 20 wt % total alumina and 50% nano-sized alumina the composition has 12% haze (FIGS. 1 and 2), a reduction in light transmission with respect to the polymer containing no particulates of 2.5% (FIGS. 3 and 4), pencil hardness 13, 11.2, and 4 times the polymer containing no particulates for pencil hardness values of 3B, HB, and B, respectively (FIGS. 5 through 10).

In addition the haze of the composition is less than 2% at all alumina ratios for up to 2.5 wt % total alumina and remains less than 2% for nano-alumina content above 80% for up to 10 wt % total alumina (FIGS. 1 and 2).

The amount of added compatibilizing surfactant added to a system does not affect the results presented above provided enough surfactant is present to render the particles compatible with the polymer (e.g. polyurethane).

Example 5

Performance of Polyurethane (PU) Films with Alumina of Different Particle Sizes

Experimentation showed an unexpected non-linear effect between nano-sized Nanophase Technology Corporation NanoTek® alumina (average particle size of 30–40 nm) and micron-sized alumina (A-16, Alcoa, average particle size of 500 nm) on the mechanical properties of the water-soluble MF polymer resin.

To evaluate the effect of alumina particle size on transparency and film hardness, a designed experiment was conducted as shown in Table III.

TABLE III

Experimental Design - Outline

| Variables | Variable Range | |
| --- | --- | --- |
| Total Alumina, wt % | 0 | 5 |
| Wt % NTC Alumina w/t total alumina | 0 | 100 (w/t - with respect to) |
| Surfactant, wt % w/r alumina | 5.8 | 9 (w/t - with respect to) |

Example 6

Alumina Dispersion Preparation

Dispersions of Alumina were prepared by adding A-16 alumina, coated NTC NanoTek® alumina, and surfactant in xylene to vials and sonicating. For each trial, a polymer film-forming coating solution (Minwax™ oil-based high-gloss polyurethane, 45.5 wt % solids) was added to the alumina/xylene dispersion and sonicated for 15 minutes.

Example 7

Film Preparation

20 Glass slides were cleaned and films prepared using a 1.0 mil Bird draw-down bar; films were prepared of the particulate/polymer blends on glass slides. The polymer films were cured by drying at room temperature for 24 hours.

Example 8

Measurement of Film Properties

Haze and transmittance of these films on glass were measured by averaging the readings over 5 positions on the film using ASTM-1003 and ASTM-1044 protocols using a BYK Gardner Haze-Gard Plus™ device.

The hardness of the films on glass was determined by the least weight necessary to cause a scratch for specified pencil leads using ASTM D-3353. Hardness is reported as a ratio of a modified film's value with respect to an unfilled film at equal pencil hardness. Haze data are plotted in FIGS. 11 and 12. Pencil hardness data are plotted in FIGS. 13–15 for pencil hardness HB.

TABLE 4

Table IV

| Trial | Total Alumina | % small | % surfactant | Haze, % | SR.HB |
| --- | --- | --- | --- | --- | --- |
| 1 | 0.00 | 50.00 | 7.00 | 0.23 | 1.25 |
| 2 | 2.50 | 78.87 | 7.00 | 1.65 | 1.75 |
| 3 | 2.50 | 0.00 | 7.00 | 4.68 | 1.75 |
| 4 | 2.50 | 100.00 | 7.00 | 0.54 | 1.00 |
| 5 | 2.50 | 50.00 | 5.00 | 2.94 | 1.75 |
| 6 | 2.50 | 50.00 | 9.00 | 3.12 | 1.50 |
| 7 | 3.95 | 78.87 | 8.16 | 2.29 | 2.25 |
| 8 | 1.06 | 78.87 | 8 16 | 0 91 | 1.25 |
| 9 | 3.95 | 21 13 | 8.16 | 7.05 | 2.25 |
| 10 | 1.06 | 21 13 | 8.16 | 2 24 | 1.50 |
| 11 | 3.95 | 78.87 | 5.85 | 2.54 | 1.75 |
| 12 | 1.06 | 78.87 | 5.85 | 0.87 | 2.00 |
| 13 | 3.95 | 21.13 | 5.85 | 7.43 | 2.50 |
| 14 | 1.06 | 21.13 | 5.85 | 2.11 | 1.50 |
| 15 | 2.50 | 50.00 | 7.00 | 3 47 | 2.00 |
| 15 | 2.50 | 50.00 | 7.00 | 2.92 | 2.00 |
| 15 | 2.50 | 50.00 | 7.00 | 2.91 | 2.50 |
| 15 | 2.50 | 50.00 | 7.00 | 3.01 | 1.50 |
| 15 | 2.50 | 50.00 | 7.00 | 3.05 | 2.25 |
| 16 | 0.00 | 0.00 | 0.00 | 0.11 | 1.00 |
| 17 | 5.00 | 0.00 | 7.00 | 11.60 | 2.00 |
| 18 | 5.00 | 100.00 | 7.00 | 0.84 | 1.50 |
| 19 | 2.50 | 21.13 | 7.00 | 3.99 | 2.25 |

Figure 11:
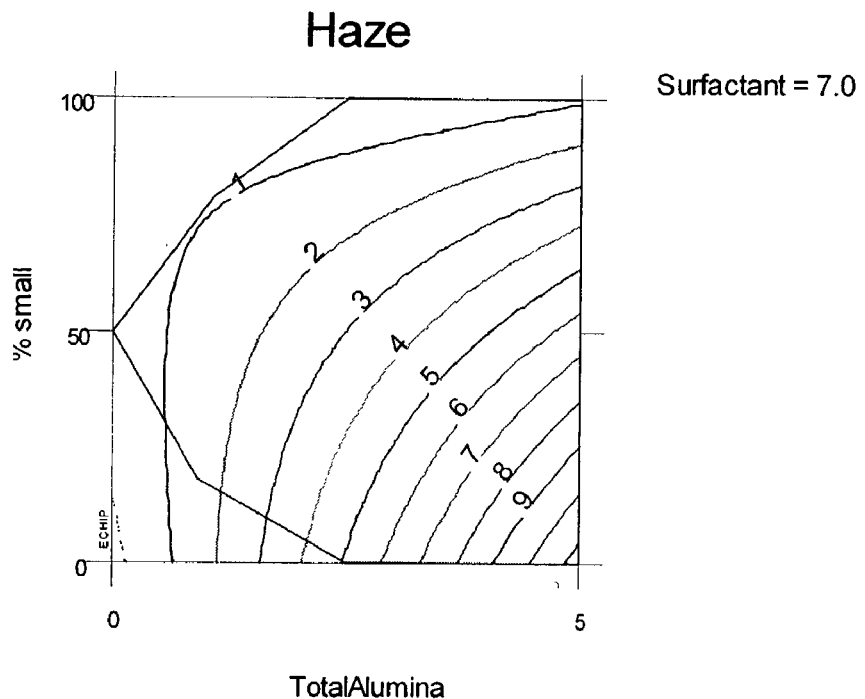
FIG. 11 is a 2D plot of haze, at 7 wt % surfactant, as a function of total alumina wt % and percent nano-alumina (indicated as % small in the graph) for an exemplary polyurethane ("PU") composition.
Figure 12:
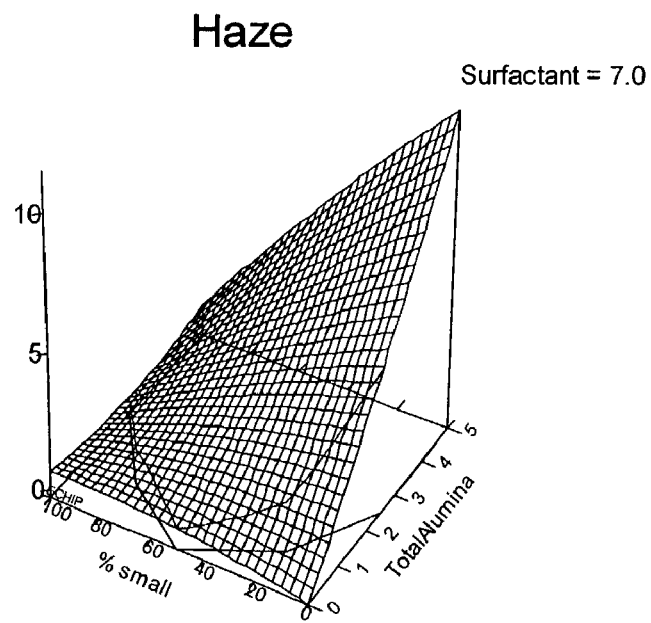
FIG. 12 is a 3D plot of haze, at 7 wt % surfactant, as a function of total alumina wt % and percent nano-alumina (indicated as % small in the graph) for the PU composition.

Haze results, for the 7 wt % surfactant level, as a function of total alumina wt % and percent nano-sized alumina (indicated as % small in the graphs), are presented in the 2D and 3D plots in the FIGS. 11 and 12, below. Haze displays linear additive behavior.

Figure 13:
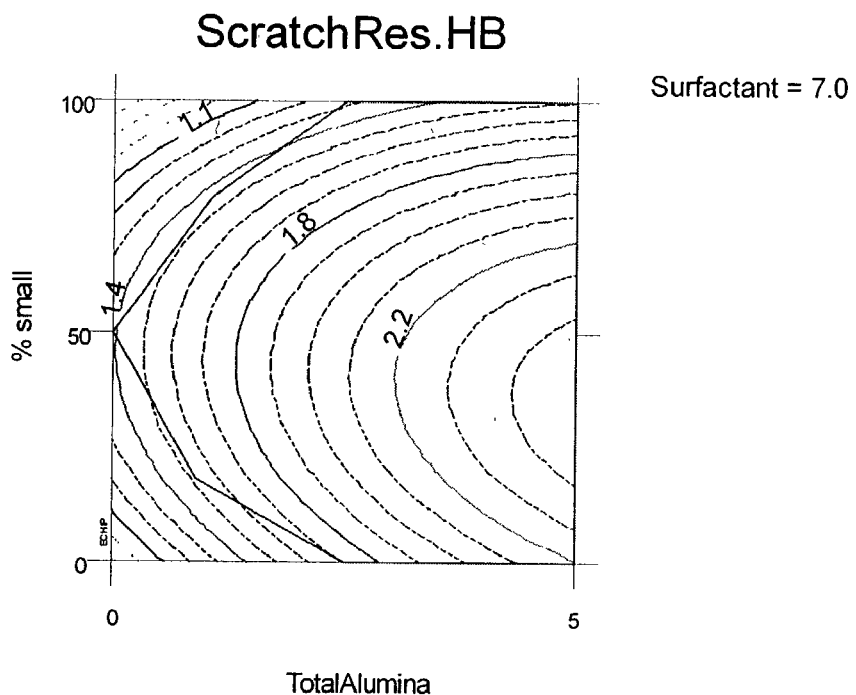
FIG. 13 is a 2D plot of film (and/or coating) hardness is presented as a function of total alumina wt % and percent nano-sized alumina (indicated as % small in the graphs) for HB pencil hardness levels for the PU composition.
Figure 14:
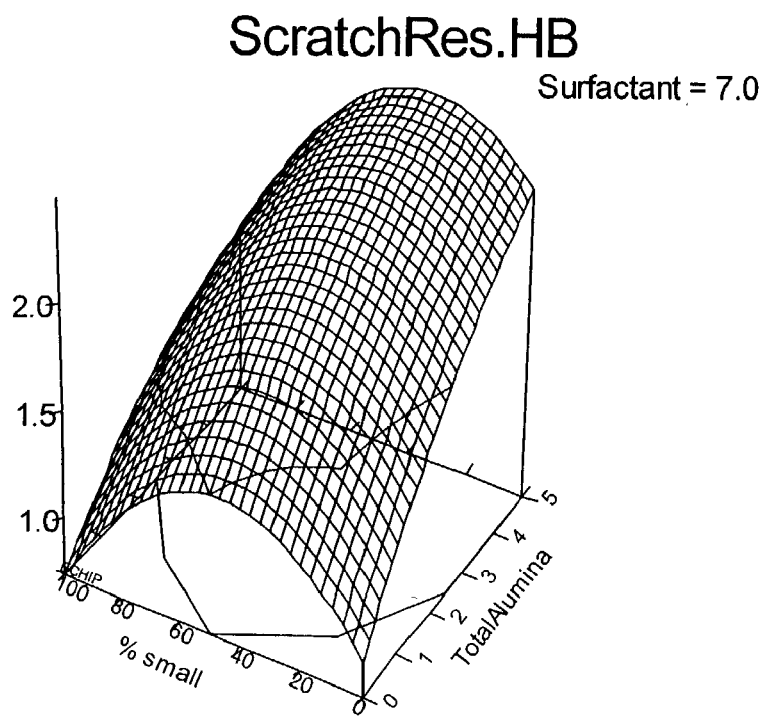
FIG. 14 is a 3D plot of film (and/or coating) hardness is presented as a function of total alumina wt % and percent nano-sized alumina (indicated as % small in the graphs) for HB pencil hardness levels for the PU composition.
Figure 15:
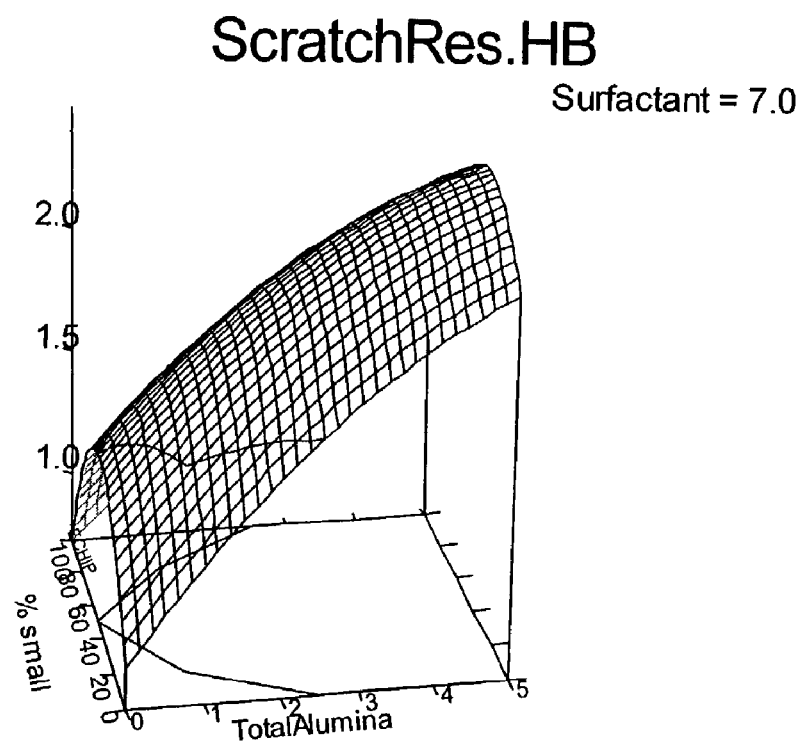
FIG. 15 is a 3D plot of film (and/or coating) hardness is presented as a function of total alumina wt % and percent nano-sized alumina (indicated as % small in the graphs) for HB pencil hardness levels for the PU composition.

Film hardness data is presented below in FIGS. 13–15 in 2D and 3D as a function of total alumina wt % and percent nano-sized alumina particulates (indicated as % small in the graphs) for the HB pencil hardness level.

The invention claimed is:

1. A composition comprising:
   a matrix material;
   a first particulate fraction comprising an average particle size of from about 1 nanometer to 100 nanometers; and
   a second particulate fraction comprising an average particle size from about 0.25 microns to about 50 microns, wherein the first particulate fraction is present in an amount between about 35 to about 65 weight percent of the total added particulate fraction.

2. The composition of claim 1, wherein the matrix material is a cured composition of materials, the materials being selected from the group comprising polyesters, polyurethane, silicones, silanes, melamine-formaldehyde-urea, phenol-formaldehyde resole and novolac, cellulosics, melamine-polyol, acrylate, inorganic-based materials, and emulsion-modified materials.

3. The composition of claim 1, wherein the matrix material is an uncured composition of materials, the materials being selected from the group comprising polyesters, polyurethane, silicones, silanes, melamine-formaldehyde-urea, phenol-formaldehyde resole and novolac, cellulosics, melamine-polyol, acrylate, inorganic-based materials, and emulsion-modified materials.

4. The composition of claim 1, wherein the second particulate fraction comprises an average particle diameter between about 0.25 microns and about 50.0 microns.

5. The composition of claim 1, wherein the first particulate fraction has an average particle dimension of from about 10 to about 50 nanometers.

6. The composition of claim 1, wherein the first particulate fraction has an average particle dimension of from about 25 to about 40 nanometers.

7. The composition of claim 1, wherein the second particulate fraction has an average particle dimension of about 0.35 to 5 microns.

8. The composition of claim 1, wherein the second particulate fraction has an average particle dimension of from about 250 nanometers to 5 microns.

9. The composition of claim 1, wherein the second particulate fraction has an average particle dimension of from about 300 nanometers to one micron.

10. The composition of claim 1, wherein the first particulate fraction is a nanocrystalline metal or metal oxide.

11. The composition of claim 1, wherein the first particulate fraction is a substantially spherical nanocrystalline metal oxide or metal.

12. The composition of claim 1, wherein the first particulate fraction is selected from the group comprising single metal oxides, mixed metal oxides, co-synthesized metal oxides, mixtures of metal oxides, metals, coated metal oxides, coated metals, carbide particulate materials, nitride particulate materials, boride particulate materials, and mixtures thereof.

13. The composition of claim 1, wherein the second particulate fraction is selected from the group comprising of single metal oxides, mixed metal oxides, co-synthesized metal oxides, mixtures of metal oxides, metals, coated metal oxides, coated metals, carbide particulate materials, nitride particulate materials, boride particulate materials, and mixtures thereof.

14. The composition of claim 1, wherein the second particulate fraction is selected from the group comprising crystalline metals, a metal oxides, and mixtures thereof.

15. The composition of claim 1, wherein the second particulate fraction is selected from the group comprising noncrystalline metals, a metal oxides, and mixtures thereof.

16. The composition of claim 1, wherein the matrix material is selected from the group comprising inorganic materials, organic materials, and combinations thereof.

17. The composition of claim 1, wherein the matrix material is one of a cross-linked material and a thermoplastic material.

18. The composition of claim 1, wherein the matrix material is selected from the group comprising polyesters, polyurethane, silicones, silanes, melamine-formaldehyde-urea, phenol-formaldehyde resole and novolac, cellulosics, melamine-polyol, acrylate, inorganic-based materials, and emulsion-modified materials.

19. The composition of claim 1, wherein total added particulate fraction is up to 50 weight percent of the composition.

20. The composition of claim 1, wherein total added particulate fraction is up to 25 weight percent of the composition.

21. The composition of claim 1, wherein total added particulate fraction is about 15 to about 25 weight percent of the composition.

22. The composition of claim 1, wherein total added particulate fraction is about 20 weight percent of the composition.

23. The composition of claim 1, wherein total added particulate fraction is about 5 weight percent of the composition.

24. A composition comprising:
   a matrix material;
   a first particulate fraction comprising an average particle size of from about 1 nanometer to about 100 nanometers; and
   a second particulate fraction comprising an average particle size of from about 0.25 microns to about 50.0 microns, wherein the first particulate fraction is composed of substantially spherical alumina and said fraction is about 50 percent by weight of the total particulate material fraction.

25. The composition of claim 24, wherein the light transmission is reduced about 2 percent with respect to a composition containing no particulates when the weight percent of total alumina is 15 weight percent.

26. The composition of claim 1, wherein the pencil hardness scratch resistance value of the composition is up to ten times greater than that of an unfilled polymeric matrix material at a loading of 15 wt. % total particulate fraction.

27. The composition of claim 1, wherein light transmission of the composition is reduced less than 2 percent with respect to a composition containing no particulates at a loading of 15 weight percent total inorganic particulate additive when the additive is alumina.

28. The composition of claim 1, wherein the haze value is less than two percent.

29. A process of making a polymeric film, comprising the steps of:
   providing a first particulate material comprising an average particle size of from about 1 nanometers to 100 nanometers to initiate a mixture,
   adding a second particulate material comprising an average particle size from about 0.25 microns to about 50 microns to form the mixture, adding a polymeric matrix material to the mixture, and utilizing the mixture to fabricate a polymeric film.

30. The process of claim 29, further comprising the step of dispersing one of the first particulate material and the second particulate material throughout the mixture.

31. The process of claim 29, wherein the first particulate material is present in an amount above 15.7 weight percent of the total particulate fraction.

* * * * *